W. HOLTORP.
MEANS FOR LUBRICATING BEARINGS.
APPLICATION FILED AUG. 21, 1908.

974,966.

Patented Nov. 8, 1910.

UNITED STATES PATENT OFFICE.

WILHELM HOLTORP, OF HAMBURG, GERMANY.

MEANS FOR LUBRICATING BEARINGS.

974,966.	Specification of Letters Patent.	Patented Nov. 8, 1910.

Application filed August 21, 1908. Serial No. 449,704.

*To all whom it may concern:*

Be it known that I, WILHELM HOLTORP, a citizen of Germany, residing at Hamburg, Germany, have invented new and useful Improvements in Means for Lubricating Bearings, of which the following is a specification.

The usual means for lubricating bearings have the drawback that too much oil is lost by them.

The present invention has for object to provide improved means which shall not have that drawback, and it consists substantially in the provision of grooves in the bushing of a bearing so arranged that these grooves are directed toward one another and unite at a determined point of the brasses. These grooves which are preferably of screw or helical arrangement, are connected with a lubricator from which they can receive a continuous supply of lubricant.

The lubricant is driven by the motion of the journal forward through the grooves to the junction of the latter where the lubricant is distributed over the journal. The lubricant is then carried by the journal to an outlet communicating with the lubricator and is forced thence by the pressure existing in the bearing into the lubricator. This arrangement reduces the loss of lubricant to a minimum, in fact almost to nothing, because it is constantly compelled to travel toward the center of the bearing and to be returned into the lubricator.

Two embodiments of this invention are illustrated by way of example in the accompanying drawings, in which—

Figure 1:
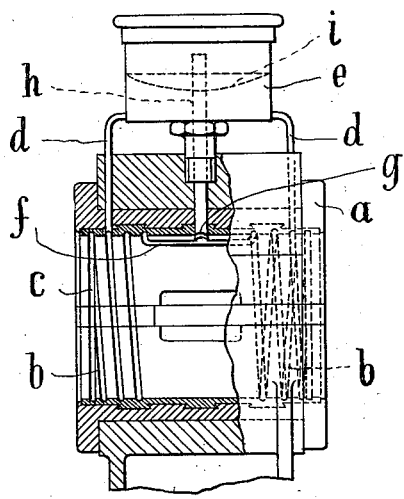
Figure 2:
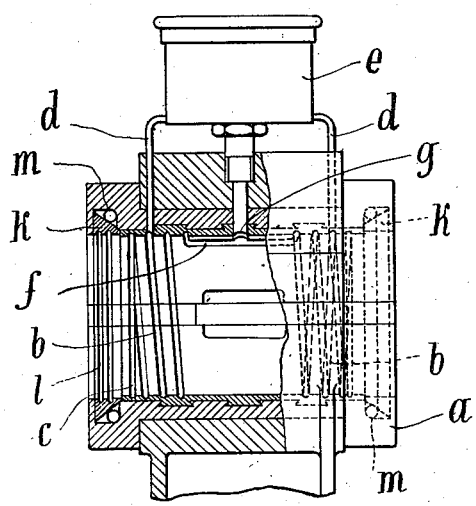

Figure 1 is a side elevation, partly in section of a simple form of lubricated journal bearing, and Fig. 2 is a similar view of a modification.

On the inner side of bush *a*, there are formed a pair of helical grooves *b*, one of said grooves being a right hand spiral, while the other groove is a left hand spiral. The inner ends of these grooves communicate by a longitudinal duct *f*, as clearly illustrated in Figs. 1 and 2.

Grooves *b* terminate at each end in a circular groove —*c*—, for the purpose of preventing the escape of that portion of the lubricant which has a tendency to pass outward. The helical grooves communicate through small pipes —*d*—, with the lubricator —*e*—, so that a continuous supply of lubricant can pass into these helical grooves. The lubricant is driven along in these grooves until it reaches the junction —*f*— of the grooves. From this junction the lubricant spreads over the journal and is carried along by the latter to the outlets —*g*—, where the pressure existing in the bearing forces the lubricant through a pipe —*h*—, back into the lubricator. Below the exit end of this pipe there is arranged a sieve —*i*—, for the purpose of straining the lubricant.

In the more developed form of this device, shown in Fig. 2, split rings —*k*—, are provided in the bearing brasses. These rings are formed with grooves —*l*—, and they are pressed by a spring —*m*—, against the journal and also outwardly against the brasses so that all loss of lubricant is prevented.

I claim:

1. In a bearing, a bushing having a right and a left hand groove, a circular groove communicating with each of the spiral grooves at the outer ends thereof to provide for a continuous passage with relation to the corresponding spiral groove and to prevent escape of the lubricant from the bearing, an oil cup, means having communication with the oil cup and the spiral grooves at the outer ends of the latter to feed lubricant by gravity to said grooves, a passage at the top of the bushing in which the inner ends of said grooves terminate, and a passage between the aforesaid passage and the cup, whereby a circulation of the lubricant from both ends of the bearing toward its center and thence through the cup back to the outer ends of the spiral grooves is maintained.

2. In a bearing, a bushing having a right and a left hand groove, a circular groove communicating with each of the spiral grooves at the outer ends thereof to provide for a continuous passage with relation to the corresponding spiral groove and to prevent escape of the lubricant from the bearing, an oil cup, means having communication with the oil cup and the spiral grooves at the outer ends of the latter to feed the lubricant by gravity to said grooves, and a passage having communication with the inner ends of said grooves and with the cup, whereby a circulation of the lubricant from both ends of the bearing toward its center and thence upwardly through the cup back to the outer ends of the spiral grooves is maintained.

3. In a bearing, a bushing having a right and a left hand groove, an oil cup, means having communication with the oil cup and the spiral grooves at the outer ends of the latter to feed lubricant to said grooves, and a passage having communication with the cup and the inner ends of the spiral grooves, whereby a circulation of the lubricant from both ends of the bearing toward its center and thence upwardly through the cup back to the outer end of the spiral grooves is maintained.

Signed by me at Hamburg this 10th day of August 1908.

WILHELM HOLTORP.

Witnesses:
HAMILTON RESEK,
ERNEST H. L. MUMMENHOFF.